(12) United States Patent
Emmitt

(10) Patent No.: X7624
(45) Date of Patent: Jun. 29, 1833

(54) WHEELS, SPOKED, CUTTING TENONS & SHOULDERS

(76) Inventor: Pitner Emmitt

The schedule referred to in these Letters Patent, and making part of
the same containing a description in the words of the said Peter
Emmett [illegible] of his improvement being a Machine for cutting
the tenons & shoulders of spokes for wheels.

---

Be it known that I, Peter Emmett, of Hopewell, in the County
of York, and State of Pennsylvania have made an improve-
ment being a Machine for cutting the tenons & shoulders of
spokes for wheels, which is described as follows.

This machine consists of the following parts viz:
A horizontal frame; two perpendicular posts erected
thereon; a block or table on which the spokes are tenoned
a driver working between the posts; four cutters, on the end
of the driver; a lever attached to the upper end of the driver
gauge and rests against which the spoke is held on the block.

The horizontal frame is constructed by mortising and
tenoning together two sills, and two or more cross pieces
forming an oblong frame of suitable size and strength,
resting on the ground. Upon this frame are erected two perpen-
dicular posts, mortised and tenoned into the sills, and braced
by inclined braces, which posts are parallel & about twelve
inches apart, connected together by cross pieces at the top
and near the centre; In the centre of these cross pieces
are made square openings to admit the driver to play freely.
The block or table on which the operation of tenoning the spokes
is performed, consists of a solid piece of timber, of an
oblong or other shape, let in between the posts in grooves
cut on the inner sides of the same, which block may be
inclined to any angle required by wedges driven in the
grooves above and below the block. The driver is made
of a piece of strong timber nearly the length of the posts
from the block upwards, and [illegible] [illegible] [illegible]

between them being kept in a vertical line by the cross pieces, or
guides, through which it passes in the square openings before
mentioned. Four steel cutters are fastened on the lower end
of the driver by screw bolts and nuts which pass through
the cutters and driver, with blocks of wood to hold them more
firm: two of the cutters are put on the sides of the driver
to cut the sides of the tenon and two on the front or face
to cut the shoulders. A lever attached to a standard (mortised
into the end of the block) by a movable joint at one of its ends
is connected to the upper end of the driver by a pin passing
through it and the lever a few inches from the end connec-
ted with the standard, a tenon being cut on the end
of the driver which is inserted into a slot in the lever.
A gauge and one or more rests are fastened on the block
to rest the spoke against when cutting the tenon. To
operate the machine the lever is raised by hand, which
elevates the driver and cutters; the spoke is then laid on
the block and held against the gauge & rests, the end on
which the tenon is to be cut being directly under the cutters
in a line with the driver, the operator now bears upon
the lever which forces down the driver and cutters on the
end of the spoke & cuts the tenon, the thickness of which being
determined by the distance apart, that the knives are placed.
For a further illustration of my invention I refer to the
model and drawing of the same deposited in the
Patent Office

What I claim as my invention and for which I
ask a Patent is the before described combination and ar-
rangement of the several parts, of the machine for cutting
the tenons & shoulders of spokes of wheels.

Oliver Emmitt.

Witnesses
Wm [illegible]
Robt [illegible]

([illegible] May [illegible])

([illegible])